US012667051B2

(12) United States Patent
Hansen

(10) Patent No.: US 12,667,051 B2
(45) Date of Patent: Jun. 30, 2026

(54) PERFORMANCE BASED AGRICULTURAL MACHINE SPEED CONTROL

(71) Applicant: Deere & Company, Moline, IL (US)

(72) Inventor: Matthew D. Hansen, Bondurant, IA (US)

(73) Assignee: Deere & Company, Moline, IL (US)

( * ) Notice: Subject to any disclaimer, the term of this patent is extended or adjusted under 35 U.S.C. 154(b) by 64 days.

(21) Appl. No.: 18/659,386

(22) Filed: May 9, 2024

(65) Prior Publication Data

US 2024/0324504 A1      Oct. 3, 2024

Related U.S. Application Data

(63) Continuation of application No. 17/487,861, filed on Sep. 28, 2021, now Pat. No. 12,114,601.

(51) Int. Cl.
*A01D 41/127* (2006.01)
*A01B 69/04* (2006.01)

(52) U.S. Cl.
CPC ........ *A01D 41/1273* (2013.01); *A01B 69/008* (2013.01); *A01D 41/1277* (2013.01); *A01D 41/1278* (2013.01)

(58) Field of Classification Search
None
See application file for complete search history.

(56) References Cited

U.S. PATENT DOCUMENTS 10,426,087 B2    10/2019  Bruns
2015/0199360 A1    7/2015  Pfeiffer et al.

2015/0199630 A1    7/2015  Pfeiffer
2015/0199637 A1    7/2015  Pfeiffer et al.
2015/0199775 A1    7/2015  Pfeiffer et al.
(Continued)

FOREIGN PATENT DOCUMENTS

CN      113207411  A    8/2021
EP      2517543  B1    6/2014

OTHER PUBLICATIONS

Extended European Search Report and Written Opinion issued in European Patent Application No. 22194446.5, dated Feb. 22, 2023, 10 pages.

(Continued)

*Primary Examiner* — Christian Chace
*Assistant Examiner* — Shayne M. Gilbertson
(74) *Attorney, Agent, or Firm* — Christopher J. Volkmann; KELLY, HOLT & CHRISTENSON PLLC

(57) ABSTRACT

A mobile agricultural machine includes a set of ground engaging elements, a controllable subsystem configured to perform a work operation on a field, and a control system. The control system is configured to identify a work performance metric representing a performance characteristic of the work operation having an inverse relationship to traversal speed of the mobile agricultural machine over the field, receive an indication of operator presence relative to the mobile agricultural machine, generate a weighting parameter that weights the work performance metric relative to a ride quality metric based on the indication of operator presence, determine a target machine speed based on the weighting parameter, and output a control instruction based on the target machine speed.

20 Claims, 13 Drawing Sheets

(56) References Cited

U.S. PATENT DOCUMENTS

| | | | |
|---|---|---|---|
| 2015/0203116 A1* | 7/2015 | Fairgrieve | B60T 8/175 |
| | | | 701/93 |
| 2015/0203118 A1 | 7/2015 | Mitsuyasu | |
| 2016/0078391 A1 | 3/2016 | Blank et al. | |
| 2016/0086291 A1* | 3/2016 | Hunt | A01D 41/127 |
| | | | 700/275 |
| 2018/0373257 A1* | 12/2018 | Runde | G05D 1/0278 |
| 2019/0059222 A1* | 2/2019 | Kelber | A01D 41/1277 |
| 2020/0037491 A1 | 2/2020 | Schoeny | |
| 2020/0156640 A1* | 5/2020 | Jonasson | B60W 30/143 |
| 2021/0084820 A1 | 3/2021 | Vandike | |
| 2021/0243936 A1 | 8/2021 | Vandike et al. | |
| 2022/0071097 A1 | 3/2022 | Robertson | |
| 2023/0094319 A1 | 3/2023 | Hansen | |
| 2023/0102576 A1 | 3/2023 | Yaroshenko | |
| 2024/0155963 A1 | 5/2024 | Travis et al. | |

OTHER PUBLICATIONS

Notice of Allowance for U.S. Appl. No. 17/487,910, dated Apr. 3, 2024, 9 pages.
Application and Drawings for U.S. Appl. No. 17/487,910, filed Sep. 28, 2021, 55 pages.
Notice of Allowance for U.S. Appl. No. 17/487,910, dated Jul. 9, 2024, 9 pages.

* cited by examiner

PERFORMANCE BASED AGRICULTURAL MACHINE SPEED CONTROL

CROSS-REFERENCE TO RELATED APPLICATION

The present application is a continuation of and claims priority of U.S. patent application Ser. No. 17/487,861, filed Sep. 28, 2021, the contents of which are hereby incorporated by reference in their entirety.

FIELD OF THE DESCRIPTION

The present description generally relates to mobile work machines. More specifically, but not by limitation, the present description relates to speed control for an agricultural machine based on work quality metrics.

BACKGROUND

There are a wide variety of different types of work machines. Those work machines can include construction machines, turf management machines, forestry machines, agricultural machines, etc. having controllable subsystem(s) that perform a variety of tasks on a worksite. The controllable subsystems are controlled by a control system responsive to user input (e.g., local or remote operators) and/or through automated processes. For example, a mobile work machine may operate in semi-autonomous or fully autonomous modes.

The discussion above is merely provided for general background information and is not intended to be used as an aid in determining the scope of the claimed subject matter.

SUMMARY

A method of controlling a mobile agricultural machine that includes detecting a target value setting input identifying a target metric value for a quality metric representing a performance characteristic of the mobile agricultural machine and having an inverse relationship to machine speed, receiving machine data indicative of operating parameters on the mobile agricultural machine, generating, based on the machine data, a current metric value for the quality metric, determining a target machine speed based on the current metric value relative to the target metric value, and outputting a control instruction that controls the mobile agricultural machine based on the target machine speed.

Example 1 is a method of controlling a mobile agricultural machine, the method comprising:

detecting a target value setting input identifying a target metric value for a quality metric representing a performance characteristic of the mobile agricultural machine and having an inverse relationship to machine speed;

receiving machine data indicative of operating parameters on the mobile agricultural machine;

generating, based on the machine data, a current metric value for the quality metric;

determining a target machine speed based on the current metric value relative to the target metric value; and outputting a control instruction that controls the mobile agricultural machine based on the target machine speed.

Example 2 is the method of any or all previous examples, wherein determining the target machine speed comprises:

determining the target machine speed using a machine learning system that is trained with training data corresponding to the performance characteristic and models an effect of machine speed changes to the performance characteristic Example 3 is the method of any or all previous examples, wherein outputting a control instruction comprises controlling a propulsion subsystem of the mobile agricultural machine based on the target machine speed.

Example 4 is the method of any or all previous examples, wherein the quality metric represents one or more of:

fuel consumption, productivity, power utilization, agricultural material loss, or agricultural material quality.

Example 5 is the method of any or all previous examples, and further comprising:

identifying a weighting parameter; and determining a target machine speed based on applying the weighting parameter to the current metric value.

Example 6 is the method of any or all previous examples, wherein the weighting parameter comprises a ride quality parameter, and further comprising:

determining the target machine speed based on the ride quality parameter.

Example 7 is the method of any or all previous examples, wherein the ride quality parameter is generated based on an indication of field roughness.

Example 8 is the method of any or all previous examples, and further comprising:

receiving an indication of operator presence; and generating the ride quality parameter based on the indication of operator presence.

Example 9 is the method of any or all previous examples, wherein the weighting parameter comprises a lateral offset parameter representing a difference between a position of the mobile agricultural machine and a predefined path, and further comprising:

determining the target machine speed based on the lateral offset parameter.

Example 10 is the method of any or all previous examples, and further comprising:

receiving an indication of machine path curvature in a path of the machine; and determining the target machine speed based on the machine path curvature.

Example 11 is the method of any or all previous examples, wherein the current metric value represents predicted performance of the mobile agricultural machine on the field.

Example 12 is a mobile agricultural machine comprising:

a set of ground engaging traction elements;

a propulsion subsystem configured to drive one or more of the ground engaging traction elements; and a control system configured to detect a target value setting input identifying a target metric value for a quality metric representing a performance characteristic of the mobile agricultural machine and having an inverse relationship to machine speed;

receive machine data indicative of operating parameters on the mobile agricultural machine;

generate, based on the machine data, a current metric value for the quality metric;

determine a target machine speed based on the current metric value relative to the target metric value; and output a control instruction that controls the mobile agricultural machine based on the target machine speed.

Example 13 is the mobile agricultural machine of any or all previous examples, wherein the control system is configured to:

determine the target machine speed using a machine learning system that is trained with training data corresponding to the performance characteristic and models an effect of machine speed changes to the performance characteristic.

Example 14 is the mobile agricultural machine of any or all previous examples, wherein the control system is configured to:

control the propulsion subsystem based on the target machine speed.

Example 15 is the mobile agricultural machine of any or all previous examples, wherein the control system is configured to:

identify a weighting parameter; and determine a target machine speed based on applying the weighting parameter to the current metric value.

Example 16 is the mobile agricultural machine of any or all previous examples, wherein the control system is configured to:

determine the target machine speed based on the ride quality parameter.

Example 17 is the mobile agricultural machine of any or all previous examples, wherein the ride quality parameter is generated based on an indication of field roughness.

Example 18 is the mobile agricultural machine of any or all previous examples, wherein the weighting parameter comprises a lateral offset parameter representing a difference between a position of the mobile agricultural machine and a predefined path, wherein the control system is configured to:

determine the target machine speed based on the lateral offset parameter.

Example 19 is a control system for an agricultural machine, the control system comprising:

at least one processor; and memory storing instructions executable by the at least one processor, wherein the instructions, when executed, cause the control system to:

detect a target value setting input identifying a target metric value for a quality metric representing a performance characteristic of the agricultural machine and having an inverse relationship to machine speed;

receive machine data indicative of operating parameters on the agricultural machine;

generate, based on the machine data, a current metric value for the quality metric;

determine a target machine speed based on the current metric value relative to the target metric value; and output a control instruction that controls the agricultural machine based on the target machine speed.

Example 20 is the control system of any or all previous examples, wherein the instructions, when executed, cause the control system to:

determine the target machine speed using a machine learning system that is trained with training data corresponding to the performance characteristic and models an effect of machine speed changes to the performance characteristic.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 6-1 and 6-2 (collectively referred to as FIG. 6) is a flow diagram showing one example of a method for controlling a mobile work machine based on work quality metrics.

DETAILED DESCRIPTION

The present disclosure generally relates to control systems for mobile work machines that control machine speed based on work quality metrics. As noted above, work machines can take a wide variety of different forms, such as, but not limited to, construction machines, turf management machines, forestry machines, agricultural machines, etc. Some examples of agricultural machines include, but are not limited to, a tilling machine, a planting machine, a product application (e.g., spraying) machine, a harvesting machine (also referred to as a "harvester" or "combine"), to name a few. While examples below are discussed in the context of an agricultural machine, but it should be understood that the features and concepts can be applied to other forms of work machines as well.

Some work machines can operate in autonomous or semi-autonomous modes in which aspects of the machine operation are controlled without requiring direct operator (or other user) input. The quality of work operations (referred to as "work quality") can be affected by speed of the machine. For example, but not by limitation, in the case of an agricultural harvesting machine, threshing efficiency decreases (e.g., crop loss increases) as the speed of the machine increases. Similarly, for an agricultural spraying machine, spraying performance (e.g., the amount of the spray pattern that hits the target area) decreases as the sprayer speed increases. These types of performance or work quality metrics are referred to as having an inverse relationship to machine speed.

The machine speed is often controlled manually by the operator or can be set by automated control schemes through setting a maximum throttle position. In many cases, these machine speed control approaches result in underperformance as the machine either travels too slowly over the worksite or travels too quickly resulting in low work quality. Thus, automated speed control approaches often do not result in high efficiency and work quality.

The present disclosure provides a control system for a work machine, such as but not limited to an autonomous or semi-autonomous agricultural machine, that performs machine speed control based on work quality metrics.

Figure 1:
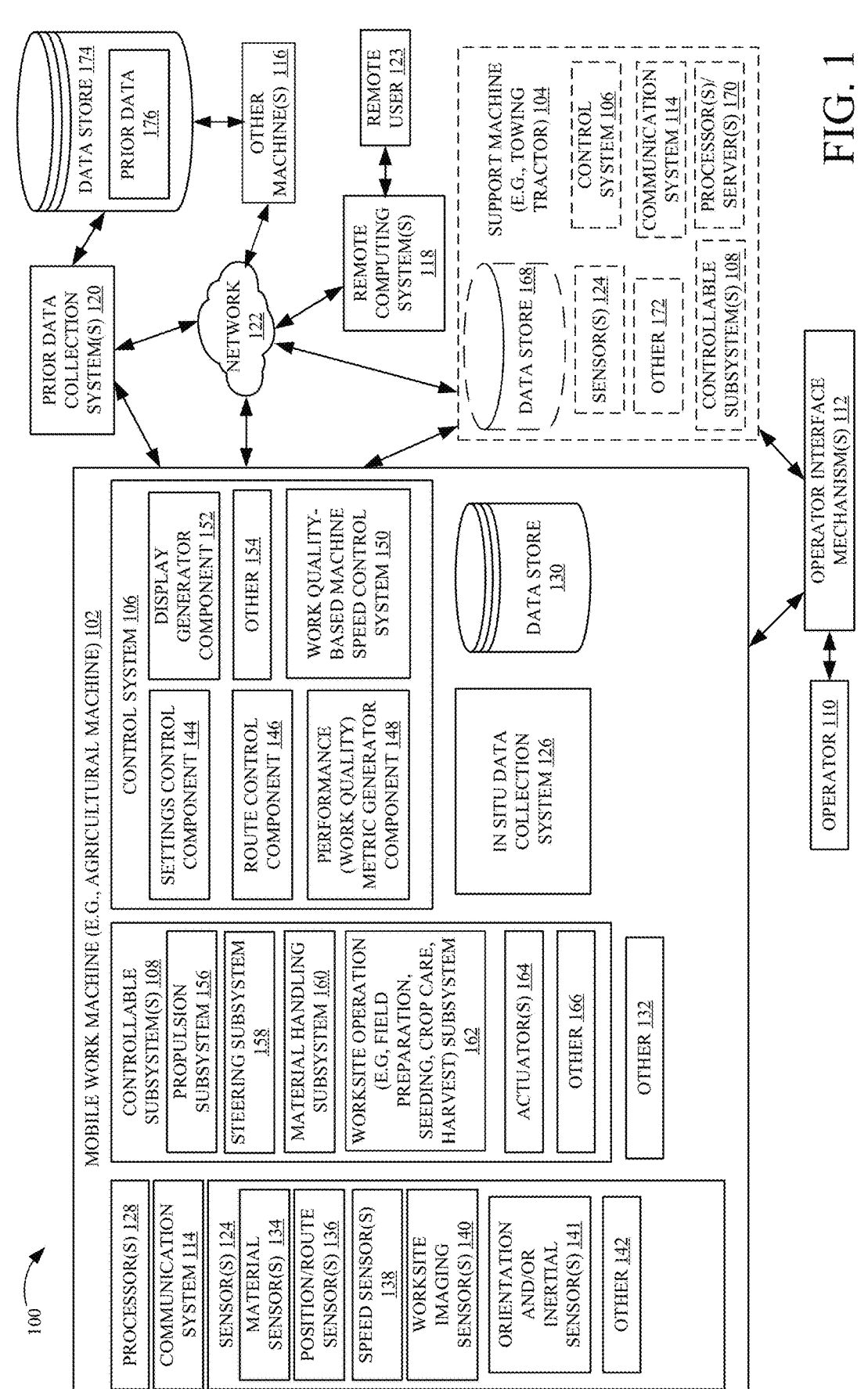
FIG. 1 is a block diagram showing one example of a work machine architecture that includes a mobile work machine.

FIG. 1 is a block diagram showing one example of a work machine architecture 100 that includes a mobile work machine 102. Mobile work machine 102 can be any type of work machine that moves and performs tasks on a worksite. Some mobile work machines perform aerial work operations, while other machines may perform nautical or under water work operations, and some machines perform ground-based work operations. Examples of work operations include agricultural, construction, and/or turf and forestry work operations.

Mobile work machine 102 also can include autonomous or semi-autonomous machines, such as robotic or self-driving vehicles. As noted above, examples of machine 102 can operate in a fully autonomous mode and/or a semi-autonomous mode in which an operator is on-board or nearby to perform one or more functions. These functions may include, for example without limitation, one or more of guidance, safeguarding, diagnosis, task monitoring, task control, or data recording.

While machine 102 is illustrated with a single box in FIG. 1, machine 102 can include multiple machines (e.g., a towed implement towed by a support or towing machine 104). In this example, the elements of machine 102 illustrated in FIG. 1 can be distributed across a number of different machines (represented by the dashed blocks in FIG. 1).

Machine 102 includes a control system 106 configured to control a set of controllable subsystems 108 that perform operations on a worksite. For instance, an operator 110 can interact with and control work machine 102 through operator interface mechanism(s) 112. Operator interface mechanism(s) 112 can include such things as a steering wheel, pedals, levers, joysticks, buttons, dials, linkages, etc. In addition, mechanism(s) 112 can include a display device that displays user actuatable elements, such as icons, links, buttons, etc. Where the device is a touch sensitive display, those user actuatable items can be actuated by touch gestures. Similarly, where mechanism(s) 112 includes speech processing mechanisms, then operator 110 can provide inputs and receive outputs through a microphone and speaker, respectively. Operator interface mechanism(s) 112 can include any of a wide variety of other audio, visual or haptic mechanisms.

Work machine 102 includes a communication system 114 configured to communicate with other systems or machines in architecture 100. For example, communication system 114 can communicate with support machine 104, other machines 116 (such as other machines operating on a same worksite as work machine 102), remote computing system(s) 118, and/or prior data collection system(s) 120, either directly or over a network 122. Network 122 can be any of a wide variety of different types of networks. For instance, network 122 can be a wide area network, a local area network, a near field communication network, a cellular communication network, or any of a wide variety of other networks, or combinations of networks.

Communication system 114 can include wired and/or wireless communication components, which can be substantially any communication system that can be used by the systems and components of machine 102 to communicate information to other items, such as between control system 106, controllable subsystems 108, and sensors 124. In one example, communication system 112 communicates over a controller area network (CAN) bus (or another network, such as an Ethernet network, etc.) to communicate information between those items. This information can include the various sensor signals and output signals generated by the sensor variables and/or sensed variables.

A remote user 123 is illustrated as interacting with remote computing system 118, such as to receive communications from or send communications to work machine 102 through communication system 114. For example, but not by limitation, remote user 123 can receive communications, such as notifications, requests for assistance, etc., from work machine 102 on a mobile device.

System(s) 120 are configured to collect prior data that can be used by work machine 102 in performing a work assignment on a worksite. Prior data can be generated from a wide variety different types or sources, such as from aerial or satellite images, thermal images, etc. The prior data can be used to generate a model, such as a predictive map, that can be used to control work machine 102. Examples of prior data include, but are not limited to, location conditions that identify various conditions that can affect operation of work machine 102.

FIG. 1 also shows that work machine 102 includes in situ data collection system 126, one or more processors 128, a data store 130, and can include other items 132 as well. Sensors 124 can include any of a wide variety of sensors depending on the type of work machine 102. For instance, sensors 124 can include material sensors 134, position/route sensors 136, speed sensors 138, worksite imaging sensors 140, orientation and/or inertial sensors 141, and can include other sensors 142 as well.

Material sensors 134 are configured to sense material being moved, processed, or otherwise worked on by work machine 102. In the case of an agricultural harvester, material sensors 134 include yield sensors. In situ (or worksite) data (such as field data) can be obtained from sensors on the machine and/or sensors on a support machine that works in parallel with work machine 102.

Position/route sensors 136 are configured to identify a position of work machine 102 and a corresponding route (e.g., heading) of work machine 102 as machine 102 traverses the worksite. Speed sensors 138 are configured to output a signal indicative of a speed of work machine 102. Worksite imaging sensors 140 are configured to obtain images of the worksite, which can be processed, for example by in situ data collection system 126, to identify conditions of the worksite. Examples of conditions include, but are not limited to, terrain topology, terrain roughness, terrain soil conditions, obstacles that inhibit operation of work machine 102, etc. In an example agricultural harvester, signals from worksite imaging sensors 140 can be used to identify crop characteristics, such as an expected yield, whether the crop being harvested is "downed", etc. In an example agricultural tiller, signals from worksite imaging sensors 140 can be used to identify a plugged or broken tillage tool, or residue buildup. In an example agricultural sprayer, signals from worksite imaging sensors 140 can be used to identify spray precision (e.g., how much of the target field area is covered by the spray). In an example agricultural planter, signals from worksite imaging sensors 140 can be used to identify seed singulation and spacing.

Sensors 141 are configured to detect an orientation and/or inertia of machine 102. Sensors 141 can include accelerometers, gyroscopes, roll sensors, pitch sensors, yaw sensors, to name a few.

Control system 106 can include settings control component 144, route control component 146, a performance or work quality metric generator component 148, a work quality-based speed control system 150, and a display generator component 152. Control system 106 can include other items 154.

Performance metric generator component 148 and work quality-based machine speed control system 150 are discussed in further detail below. Briefly, however, component 148 is configured to generate performance metrics indicative of the operational performance of work machine 102. The performance metrics indicate a quality of the work being performed by machine 102 on one or more dimensions. At least some of the performance metrics have an inverse relationship to machine speed. That is, the performance metric decreases (e.g., the work quality degrades) as machine speed increases. In one example, performance metric generator component 148 is configured to calculate a performance or work quality score for each of a plurality of different performance pillars (or performance categories) that can be used to characterize the operation of machine 102. The performance categories can vary depending on the type of work machine and operations to be performed on the worksite. The particular performance pillars, and associated scores, are described in greater detail below.

Controllable subsystems 108 can include propulsion subsystem 156, steering subsystem 158, material handling subsystem 160, worksite operation subsystem 162, one or more different actuators 164 that can be used to change machine settings, machine configuration, etc., and can include a wide variety of other systems 166, some of which are described below.

Propulsion subsystem 156 includes an engine (or other power source) that drives a set of ground engaging traction elements, such as wheels or tracks. Steering subsystem 158 is configured to control a direction of machine 102 by steering one or more of the ground engaging traction elements.

Settings control component 144 can control one or more of subsystems 108 in order to change machine settings based upon the predicted and/or observed conditions or characteristics of the worksite. By way of example, in the case of an agricultural harvesting machine or combine, settings control component 144 can actuate actuators 164 that change the positioning of a header, the concave clearance, etc., based upon the predicted yield or biomass to be encountered by the machine. In the case of an agricultural tilling machine, settings control component 144 can control the positioning or down pressure on the tilling implement by controlling actuators 162.

In one example, control of the traversal of machine 102 over the field can be automated or semi-automated, for example using an automated guidance system. For instance, route control component 146 is configured to guide machine 102 along a path across the field using the geographic position sensed by sensors 136.

Subsystem 162 is configured to perform worksite operations while machine 102 traverses the field or other worksite. A field operation refers to any operation performed on a worksite or field. For example, in the case of an agricultural machine, worksite operations include field preparation (e.g., tilling), crop seed placement (e.g., planting), crop care (e.g., fertilizer spraying), harvesting, etc.

Data store 130 is configured to store data for use by machine 102. For example, in agricultural applications the data can include field location data that identifies a location of the field to be operated upon by a machine 102, field shape and topography data that defines a shape and topography of the field, crop location data that is indicative of a location of crops in the field (e.g., the location of crop rows), or any other data.

Further, where machine 102 is towed or otherwise supported by support machine 104, machine 104 can include a data store 168 and one or more processors or servers 170, and can include other items 172.

Prior data collection system 120 illustratively collects worksite data, such as prior data corresponding to a target field to be operated upon by machine 102. Briefly, by prior, it is meant that the data is formed or obtained beforehand, prior to the operation by machine 102. The data generated by system 120 can be sent to machine 102 directly and/or can be stored in a data store 174 as prior data 176. Control system 106 can use this data to control operation of one or more subsystems 108.

Figure 2:
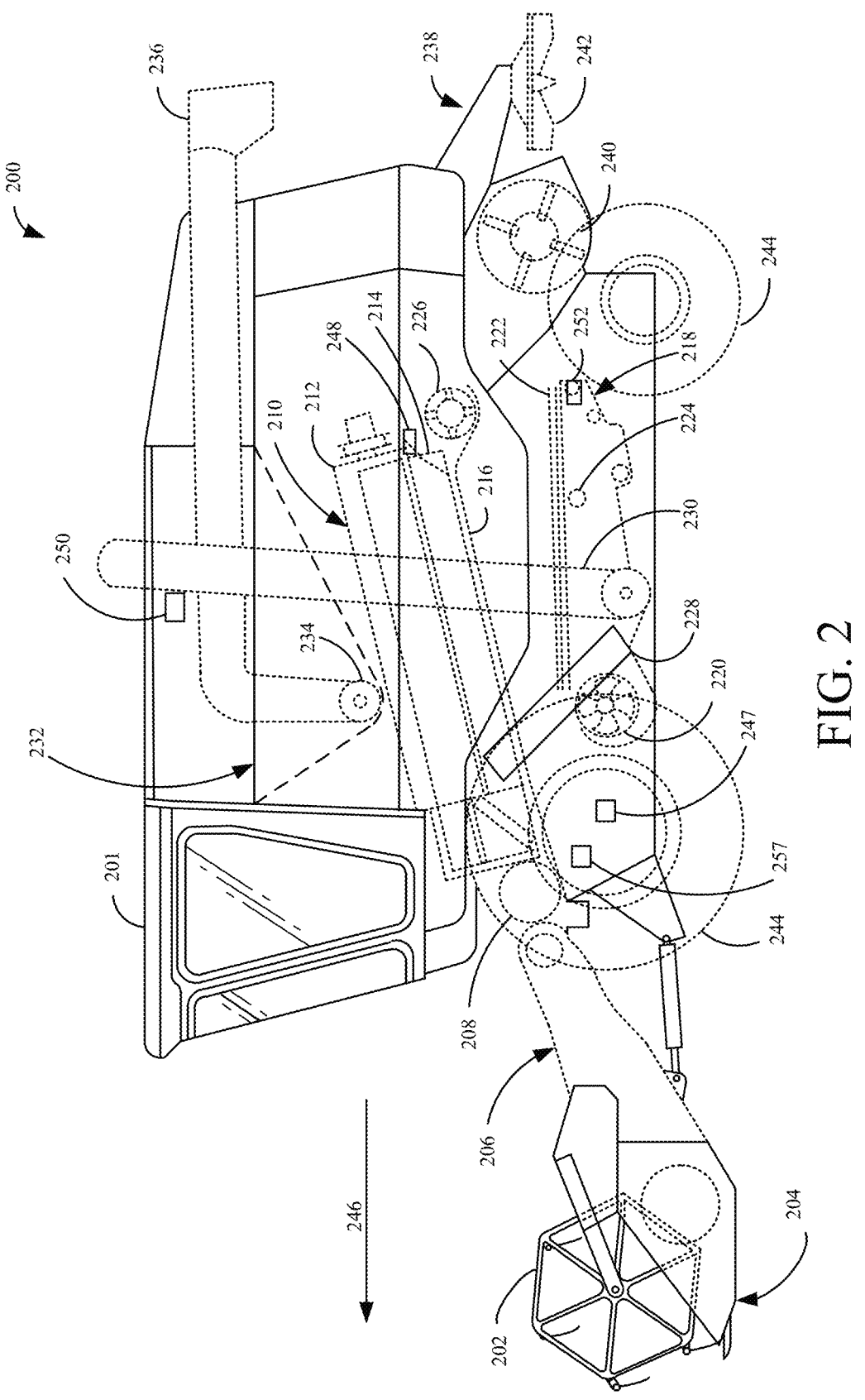
FIG. 2 is a partial schematic, partial pictorial illustration of one example of a mobile work machine.

As noted above, work machine 102 can take a wide variety of different forms. FIG. 2 illustrates one example of an agricultural work machine. More specifically, FIG. 2 is a partial pictorial, partial schematic, illustration of a combine harvester (or combine) 200.

It can be seen in FIG. 2 that combine 200 illustratively includes an operator compartment 201, which can have a variety of different operator interface mechanisms, for controlling combine 200, as will be discussed in more detail below. Combine 200 can include a set of front end equipment that can include header 202, and a cutter generally indicated at 204. Combine 200 can also include a feeder house 206, a feed accelerator 208, and a thresher generally indicated at 210. Thresher 210 illustratively includes a threshing rotor 212 and a set of concaves 214. Further, combine 200 can include a separator 216 that includes a separator rotor. Combine 200 can include a cleaning subsystem (or cleaning shoe) 218 that, itself, can include a cleaning fan 220, chaffer 222 and sieve 224. The material handling subsystem in combine 200 can include (in addition to a feeder house 206 and feed accelerator 208) discharge beater 226, tailings elevator 228, clean grain elevator 230 (that moves clean grain into clean grain tank 232) as well as unloading auger 234 and spout 236. Combine 200 can further include a residue subsystem 238 that can include chopper 240 and spreader 242. Combine 200 can also have a propulsion subsystem that includes an engine (or other power source) that drives ground engaging wheels 244 or tracks, etc. It will be noted that combine 200 may also have more than one of any of the subsystems mentioned above (such as left and right cleaning shoes, separators, etc.).

In operation, and by way of overview, combine 200 illustratively moves through a field in the direction indicated by arrow 246. As combine 200 moves, header 202 engages the crop to be harvested and gathers the crop toward cutter 204. After the crop is cut, the crop is moved through a conveyor in feeder house 206 toward feed accelerator 208, which accelerates the crop into thresher 210. The crop is threshed by rotor 212 rotating the crop against concave 214. The threshed crop is moved by a separator rotor in separator 216 where some of the residue is moved by discharge beater 226 toward the residue subsystem 238. The residue can be chopped by residue chopper 240 and spread on the field by spreader 242. In other implementations, the residue is simply dropped in a windrow, instead of being chopped and spread.

Grain falls to cleaning shoe (or cleaning subsystem) 218. Chaffer 222 separates some of the larger material from the grain, and sieve 224 separates some of the finer material from the clean grain. Clean grain falls to an auger in clean grain elevator 230, which moves the clean grain upward and deposits the clean grain in clean grain tank 232. Residue can be removed from the cleaning shoe 218 by airflow generated by cleaning fan 220. That residue can also be moved rearwardly in combine 200 toward the residue handling subsystem 238.

Tailings can be moved by tailings elevator 228 back to thresher 210 where the tailings can be re-threshed. Alternatively, the tailings can also be passed to a separate re-threshing mechanism (also using a tailings elevator or another transport mechanism) where the tailings can be re-threshed as well.

FIG. 2 also shows that, in one example, combine 200 can include ground speed sensor 247, one or more separator loss sensors 248, a clean grain camera 250, and one or more cleaning shoe loss sensors 252. Ground speed sensor 247 illustratively senses the travel speed of combine 200 over the ground. This can be done by sensing the speed of rotation of the wheels, the drive shaft, the axel, or other components. The travel speed and position of combine 200 can also be sensed by a positioning system 257, such as a global positioning system (GPS), a dead reckoning system, a LORAN system, or a wide variety of other systems or sensors that provide an indication of travel speed.

Cleaning shoe loss sensors 252 illustratively provide an output signal indicative of the quantity of grain loss by both the right and left sides of the cleaning shoe 218. In one example, sensors 252 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 252 can include only a single sensor as well, instead of separate sensors for each shoe.

Separator loss sensor 248 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 248 may also include only a single sensor, instead of separate left and right sensors.

It will also be appreciated that sensor and measurement mechanisms (in addition to the sensors already described) can include other sensors on combine 200 as well. For instance, the sensors can include a residue setting sensor that is configured to sense whether machine 200 is configured to chop the residue, drop a windrow, etc. The sensors can include cleaning shoe fan speed sensors that can be configured proximate fan 220 to sense the speed of the fan. The sensors can include a threshing clearance sensor that senses clearance between the rotor 212 and concaves 214. The sensors include a threshing rotor speed sensor that senses a rotor speed of rotor 212. The sensors can include a chaffer clearance sensor that senses the size of openings in chaffer 222. The sensors can include a sieve clearance sensor that senses the size of openings in sieve 224. The sensors can include a material other than grain (MOG) moisture sensor that can be configured to sense the moisture level of the material other than grain that is passing through combine 200. The sensors can include machine setting sensors that are configured to sense the various configurable settings on combine 200. The sensors can also include a machine orientation sensor that can be any of a wide variety of different types of sensors that sense the orientation or pose of combine 200. Crop property sensors can sense a variety of different types of crop properties, such as crop type, crop moisture, and other crop properties. The sensors can also be configured to sense characteristics of the crop as the crop is being processed by combine 200. For instance, the sensors can sense grain feed rate, as the grain travels through clean grain elevator 230. The sensors can sense yield as mass flow rate of grain through elevator 230, correlated to a position from which the grain was harvested, as indicated by position sensor 257, or provide other output signals indicative of other sensed variables.

Figure 3:
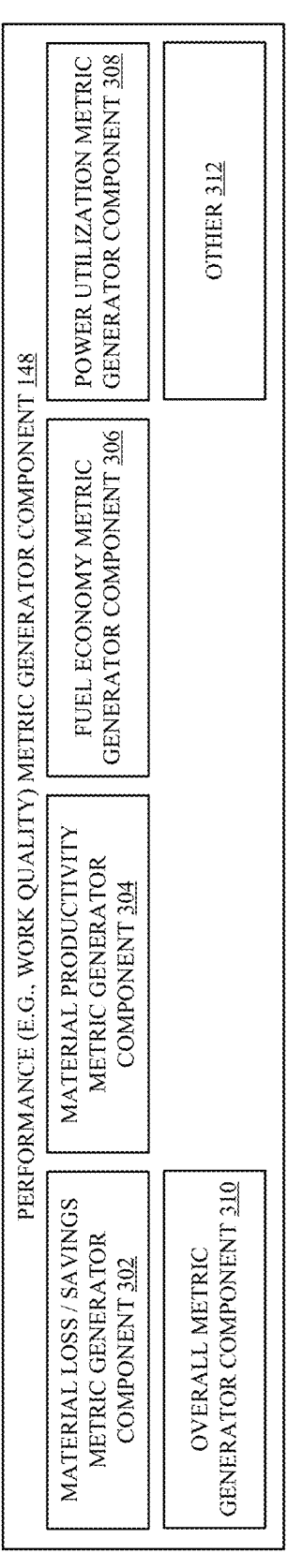
FIG. 3 is a block diagram showing one example of a performance metric generator component.

FIG. 3 is a block diagram showing one example of performance or work quality metric generator component 148, in more detail. Briefly, component 148 is configured to generate quality metric(s) representing machine performance on any of a wide variety of criteria or categories, such as fuel consumption, productivity, power utilization, agricultural material loss (e.g., harvester residue percentage), agricultural material quality, to name a few. As discussed below, machine work quality can be generated based on machine data acquired by machine sensors, including imaging components such as cameras that acquire images of the field and/or the machine subsystems. For instance, in an example agricultural harvester, a camera can acquire images that provide information on residue percentage that is used by component 148 to generate a work quality metric for harvesting productivity. In another example of an agricultural tilling machine, a camera can acquire images that provide information on ground engagement of tilling tools, that is used by component 148 to generate a work quality metric for tilling productivity. In another example of an agricultural spraying machine, a camera can acquire images that provide information on work coverage area, that is used by component 148 to generate a work quality metric for sprayer productivity.

In the example shown in FIG. 3, performance metric generator component 128 includes material lost/savings metric generator component 302, material productivity metric generator component 304, fuel economy metric generator component 306, power utilization metric generator component 308, overall metric generator component 310, and component 128 can include a wide variety of other items 312 as well. Some ways of generating performance metrics are shown in more detail in co-pending US Patent Publications Numbers 2015/0199637 A1, 2015/0199360 A1, 2015/0199630 A1, 2015/0199775 A1, 2016/0078391 A1 which are incorporated herein by reference.

Material loss/savings metric generator component 302 illustratively generates a metric indicative of material savings or loss that the machine 102 is experiencing. In the case of an agricultural harvesting machine, this can include grain loss or savings generated by sensing and combining items, such as the mass flow of crop through the harvester sensed by a mass flow sensor, tailings volume of tailings of output by the harvester using a volume sensor, crop type, the measured loss on the harvester using various loss sensors (such as separator loss sensors, cleaning shoe loss sensors, etc.), among others. The metric can be generated by performing an evaluation of the loss using fuzzy logic components and an evaluation of the tailings, also using fuzzy logic components. Based upon these and/or other considerations, loss/savings metric generator component 302 illustratively generates a loss/savings metric indicative of the performance of the machine, with respect to material loss/savings.

Material productivity metric generator component 304 uses the sensor signal generated by sensors on the machine to sense productivity of the machine. In the case of an agricultural harvester, component 304 illustratively uses the sensor signals generated by sensors on the machine to sense vehicle speed, mass flow of grain through the machine, and the machine configuration and generates an indication of crop yield and processes the crop yield to evaluate the crop yield against a productivity metric. For instance, a productivity metric plotted against a yield slope provides an output indicative of grain productivity. This is one example.

Fuel economy metric generator component 306 illustratively generates a fuel economy metric, based upon the productivity of the machine versus fuel consumption rate sensed by sensors on the machine. For example, in the case of an agricultural harvester, this can be based upon the throughput versus fuel consumption rate, a separator efficiency metric and also, based upon sensed fuel consumption, vehicle state, vehicle speed, etc. The fuel economy metric can be based on a combination of working (e.g., harvest) fuel efficiency and a non-productive fuel efficiency. These metrics may include, respectively, the efficiency of the machine during working operations and other, non-working operations (such as when idling, etc.).

Power utilization metric generator component 308 illustratively generates a power utilization metric based on sensor signals (or based on derived engine power used by the machine, that is derived from sensor signals). The sensors may generate sensor signals indicative of engine usage, engine load, engine speed, etc. The power utilization metric can indicate whether the machine could be more efficiently run at higher or lower power levels, etc.

Overall metric generator component 310 illustratively generates a metric that is based upon a combination of the various metrics output by components 302-308. Component 310 illustratively provides a metric indicative of the overall operational performance of the machine.

Figure 4:
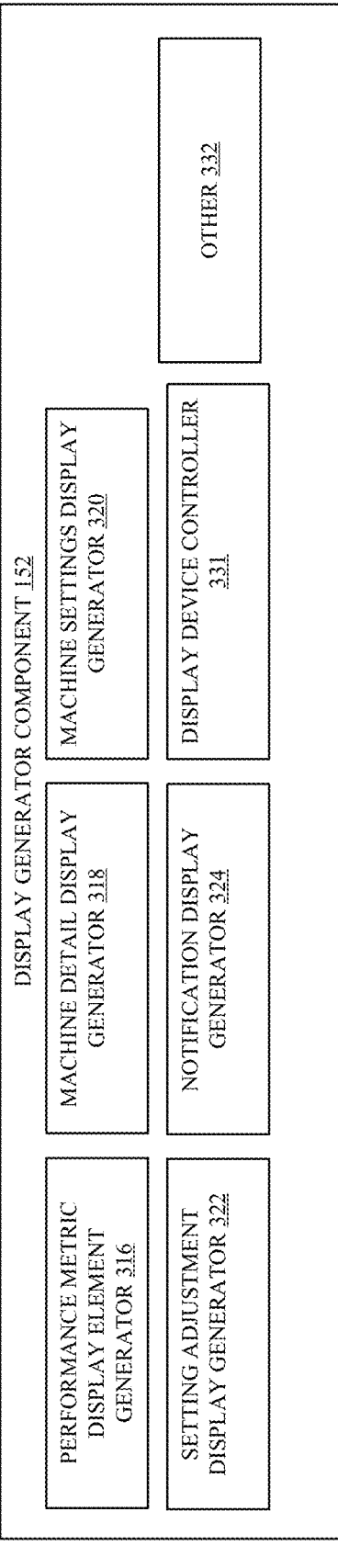
FIG. 4 is a block diagram showing one example of a display generator component.

FIG. 4 is a block diagram showing one example of display generator component 152. Display generator component 152 illustratively generates a control interface display for operator 110, or another user such as remote user 123. The display can be an interactive display with user input mechanisms for interaction by operator 110.

Display generator component 152 illustratively includes performance metric display generator 316, machine detail display generator 318, machine settings display generator 320, setting adjustment display generator 322, notification display generator 324, display device controller 331 and component 152 can include a wide variety of other items 332.

Performance metric display generator 316 illustratively generates display elements that display the performance metrics for a selected combine, or a group of combines (so that the performance metrics can be compared from one machine to the next). The metrics can be those described above with respect to performance metric generator component 242 on combine 100 and those generated by the various items on a remote analytics system.

Machine detail display generator 318 illustratively obtains various machine details (some of which will be described in greater detail below) for a machine under analysis and generates display elements that are indicative of the machine details. For instance, the machine detail display generator 318 can control communication system 276 to obtain near real time sensor signal values from sensors 246 on combine 100, and generate display elements indicative of those sensor signal values. This is just one example.

Machine settings display generator 320 illustratively obtains the current machine settings for the combine 100 under analysis and generates display elements indicative of those machine settings. Some examples of this are shown and described below.

Setting adjustment display generator 322 illustratively generates a setting adjustment display, with setting adjustment actuators that can be actuated by user 220 in order to adjust the settings on the combine being analyzed, or on a set of combines. There are a variety of different adjustment actuators that can be used and some examples are described below.

Notification display generator 324 illustratively generates notification displays based upon notifications or alerts received from other items in architecture 200. Generator 324 also displays those generated by the application running on user computing system 204.

Display device controller 331 illustratively controls a display device on user computing system 204 in order to display the various elements and displays generated by the items 316-324. Again, some examples of these are described in greater detail below.

Figure 5:
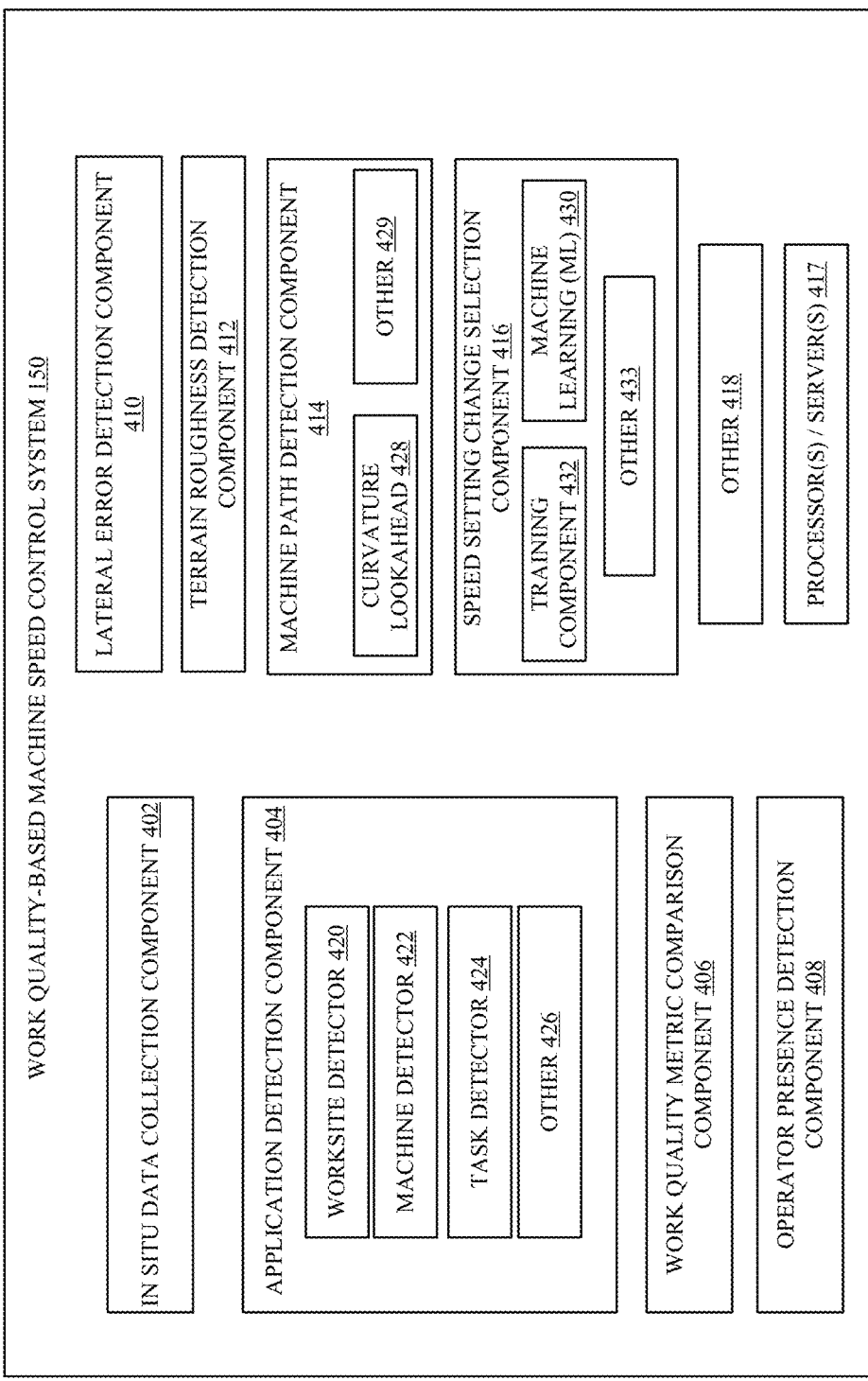
FIG. 5 is a block diagram showing one example of a work quality-based machine speed control system.

FIG. 5 is a block diagram showing one example of work quality-based machine speed control system 150. System 150 includes an in situ data collection component 402, an application detection component 404, a work quality metric comparison component 406, an operator presence detection component 408, a lateral error detection component 410, a terrain roughness detection component 412, a machine path detection component 414, and a speed setting change selection component 416. System 150 can include one or more processors or servers 417, and can include other items 418 as well. In situ data collection component 402 is configured to collect or otherwise obtain data during the operation of work machine 102 on the worksite. This can include data from sensors 124 on machine 102. For example, worksite imaging sensors 150 can obtain images of the worksite in a path of work machine 102 as well as operation of various subsystems 108. For example, in situ data collection component 402 can receive data from the various sensors discussed above with respect to FIG. 2. In another example of an agricultural spraying machine, in situ data collection component 402 can receive images indicating coverage of the spray nozzles relative to target areas on the field. In another example of an agricultural tilling machine, in situ data collection component 402 can receive images from camera that detect whether the tillage tool has become plugged or is otherwise operating inefficiently. Suffice it to say that component 402 can receive any data that indicates operation of various aspects of machine 102, either from on-board sensors or from remote sources such as remote imaging components, unmanned aerial vehicles (UAVs) or drones, other machines on the worksite, etc.

Application detection component 404 is configured to detect various aspects of the application being performed by machine 102 on the worksite. Illustratively, component 404 includes a worksite detector 420 configured to detect the worksite being operated upon by work machine 102. For instance, in the case of an agricultural machine, this can include a field identifier that identifies the particular field and can be used to obtain data identifying the target worksite operations, machine path, etc. Component 404 can also include a machine detector 422 configured to detect the machine 102 operating on the worksite, and can include a task detector 424 configured to detect the various tasks to be performed by machine 102. Component 404 can include other items 426 as well.

Task detector 424 can receive a work machine assignment, for example from remote system 118, that indicates a starting location, a destination location and a path to be taken from the starting location to the destination location across the worksite. Task detector 424 can identify areas on the field at which the machine operations are to be performed (e.g., areas to be harvested, sprayed, tilled, planted, etc.).

Metric comparison component 406 is configured to compare a current metric value for a quality metric (representing a current performance characteristic of work machine 102) to a target or threshold value, which can be set in any of a number of ways. This is discussed in further detail below. Briefly, however, component 406 is configured to determine whether work machine 102 is operating at a target performance on one or more performance dimensions (e.g., threshold efficiency, spraying efficiency, etc.).

Operator presence detection component 408 is configured to detect whether an operator is present on-board work machine 102. For instance, in the case of combine 200, component 408 is configured to detect whether an operator is present within operator compartment 201. Operator presence detection can be accomplished in a number of ways. For instance, operator presence detection can be based on input from cameras that view the operator compartment, seat switches that detect operator presence based on switch depression, input or lack of input received from operator input mechanisms (i.e., whether an operator is engaging controls within the operator compartment), to name a few.

The lateral error detection component 410 is configured to detect lateral error, or the offset of machine 102 relative to the target path. In one example, lateral error detection can be based on a comparison of a current location of the machine as detected based on sensor signals from positions sensors 136 and a machine path defined in a work assignment.

Terrain roughness detection component 412 is configured to detect roughness of the terrain being operated upon by work machine 102. As discussed below, detected roughness can be utilized to select a target machine speed based on a predefined or user selected ride quality or ride smoothness setting. As noted above, sensors 141 can detect pitch, roll, and yaw of machine 102, as well as acceleration on multiple axes. Thus, pitch data during a sampling interval can be used to obtain pitch acceleration and roll data for the sampling interval can be used to obtain roll acceleration. A surface roughness estimator determines or estimates a surface roughness of the worksite area based on the detected motion data, pitch data, roll data, and/or other position or movement data. Alternatively, or in addition, image data of the worksite in a forward field of view of machine 102 can be collected, for example from worksite imaging sensors 140. Based on the collected image data, a visual surface roughness index can be estimated for the area of the field in front of machine 102.

The surface roughness could be measured in any of a number of ways. For instance, the data from sensors 124 can utilized to generate a surface roughness metric on a predefined scale (e.g., 0 to 100). Based on machine speed, the field roughness can be correlated to an expected machine ride quality or roughness. For example, component 412 can estimate the precise attitude (e.g., yaw data, roll data, or both) of machine 102 as well as the current or predicted acceleration (e.g., in meters per second squared ($m/s^2$) on any of a number of axes. The target terrain roughness can be set as a maximum attitude and/or acceleration of machine 102 and the machine speed can be selected to maintain the actual machine attitude and acceleration below the target set point(s). Further, when ride quality is utilized as a weighting constraint in generating the target machine speed, a target machine ride roughness can be set and the machine speed can be selected to maintain the machine ride quality below the target setting. This, of course, is for sake of example only.

Machine path detection component 414 is configured to detect a path (e.g., current and/or future) of machine 102 over the worksite. Illustratively, component 414 includes a curvature lookahead component 428 configured to identify dimensions of curvature of the path ahead of machine 102, which can be utilized in speed control. This is discussed in further detail below. Briefly, the radius or degree of curvature of the machine path can be utilized to identify a predicted effect on the performance metrics, as the machine enters the curvature, which in turn can be utilized to identify a target machine speed increase or decrease. Component 414 can include other items 429 as well.

Speed setting change selection component 416 is configured to identify and select changes to machine speed based on input from components of control system 150. This is discussed in further detail below. Briefly, in one example, component 416 utilizes an output from work quality metric comparison component 416 that indicates a difference between a current metric value for a particular quality metric relative to a predefined or dynamically selected target value for that quality metric. Component 416 determines an amount at which the speed of machine 102 can be increased based on this comparison, along with an indication of terrain roughness and curvature lookahead.

Illustratively, component 416 includes a machine learning component 430 and a training component 432 configured to train machine learning component 430. Component 416 can include other items 433 as well.

In one example, artificial intelligence (AI) can be utilized to identify machine capabilities, and to determine how to adjust machine settings to achieve work assignment criteria and the target work quality. The machine learning and training components can include a variety of different types of learning mechanisms, such as a neural network that is trained based on corresponding training logic using training data. Briefly, a neural network can include a deep neural network (DNN), such as a convolutional neural network (CNN). Of course, other types of classification or learning mechanisms, such as rule-based classifiers, Bayesian network, decision trees, etc. can be utilized.

Machine learning component 430 includes a machine learning model configured to determine an increase in machine speed 102 (e.g., to a maximum machine speed) that achieves the target work quality of machine 102. The machine learning model can take into consideration inputs from external sensors, and can also consider ride quality parameters. For example, as discussed in further detail below, component 416 can weight the machine speed determination based on a ride quality parameter in response to a determination that an operator is present in the operator compartment.

The machine learning model thus models the effect of changes in machine speed on various machine performance categories given prior data and/or in situ data collected in any of a number of ways. For instance, the in situ data can represent field data, machine data, or any other types of data. The field data can indicate field characteristics, such as terrain slope, crop data, etc. The machine data can indicate settings of the machine. The machine learning model is trained to adjust the machine operating parameters based on these various inputs.

Figures 1, 6:
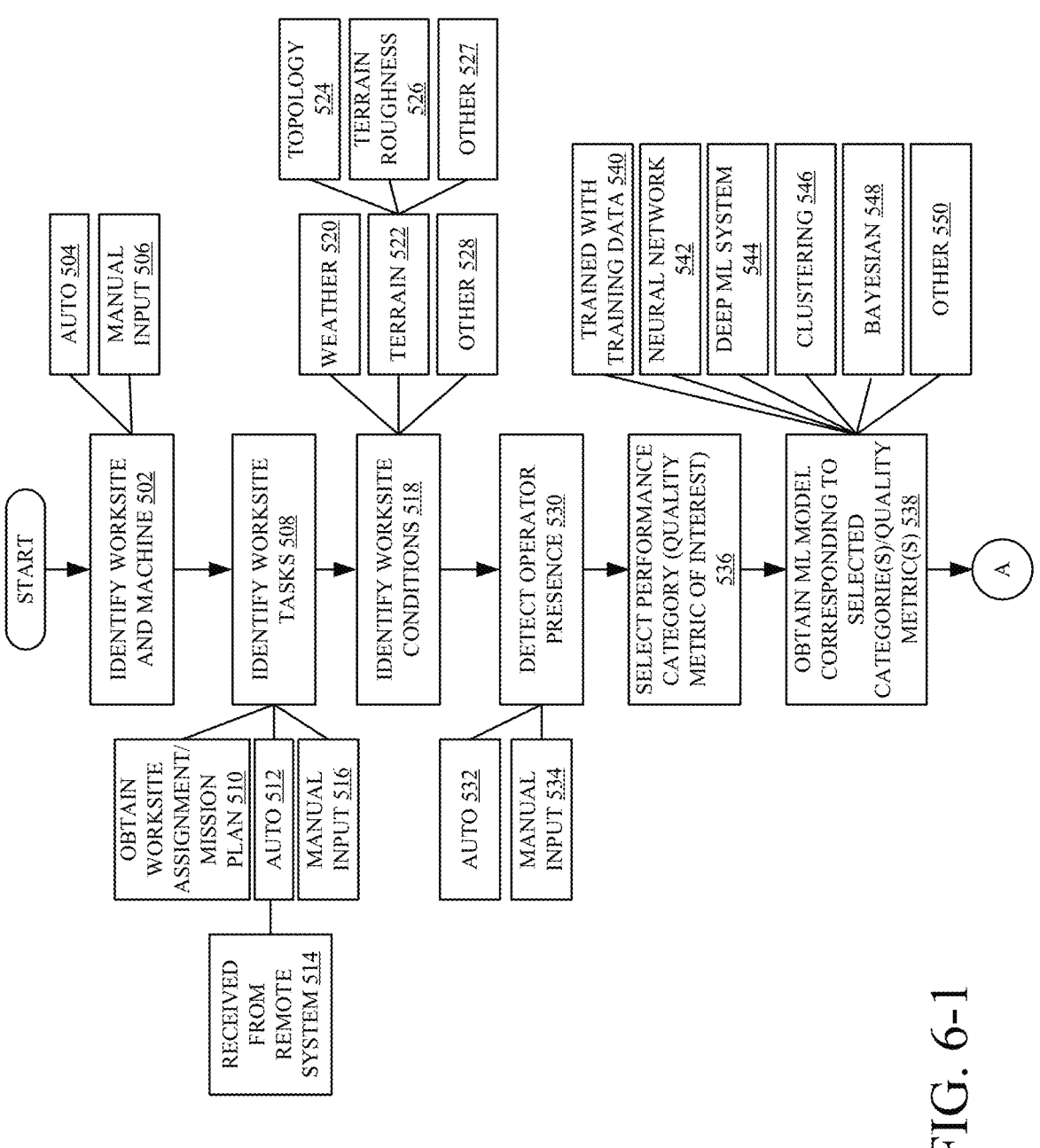
Figures 2, 6:
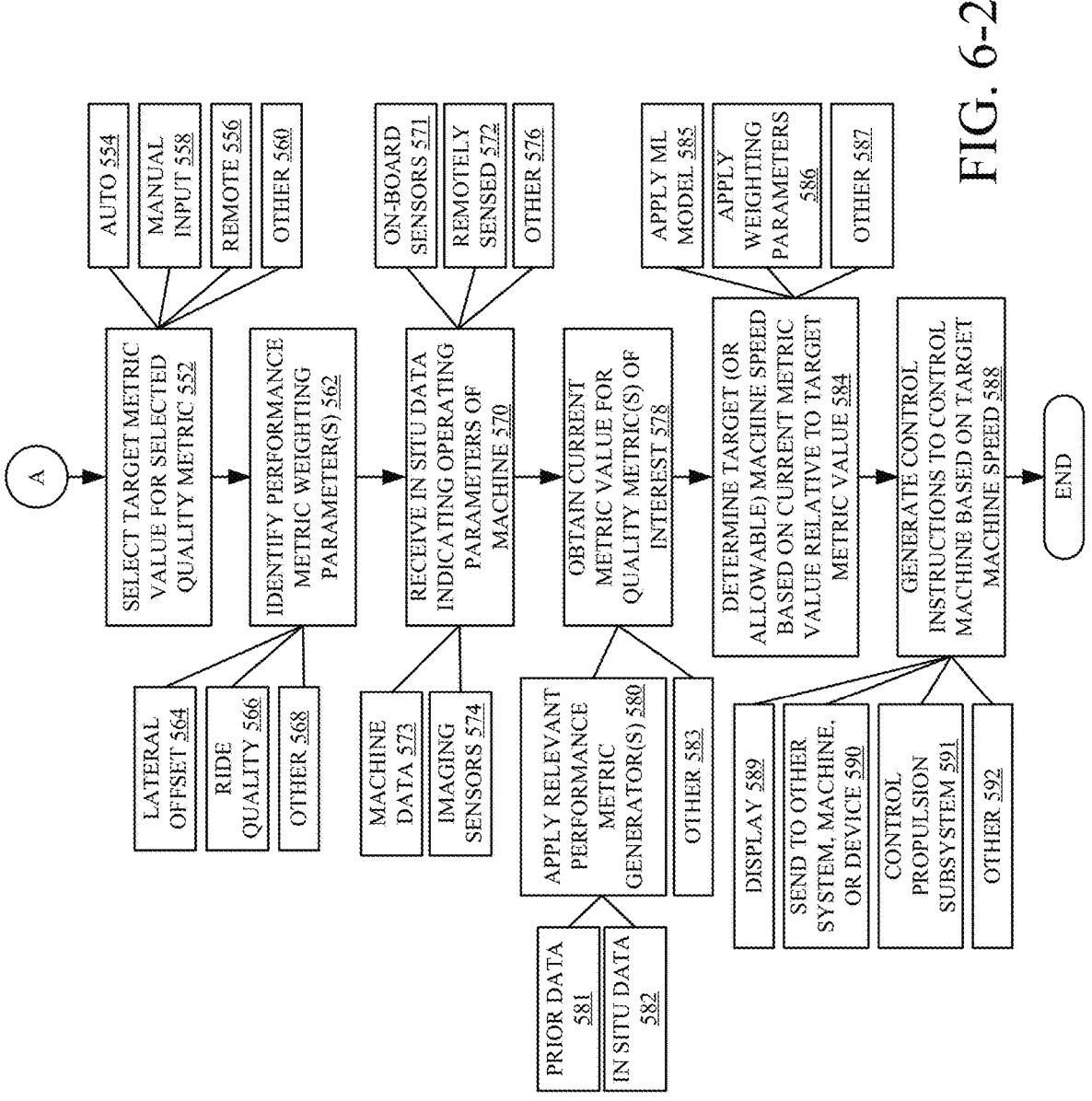

FIGS. 6-1 and 6-2 (collectively referred to as FIG. 6) provide a flow diagram illustrating one example of work quality-based machine speed control. For sake of illustration, but not by limitation, FIG. 6 will be described in the context of control system 150 shown in FIG. 5 controlling mobile work machine 102 shown in FIG. 1.

At block 502, the worksite and/or machine are identified. This can be done automatically, such as based on inputs from sensors 124 and/or remote computing system 118 (block 504). For example, worksite detector 420 can receive a location signal from sensor 136 that indicates a current location of machine 102, and detect the worksite being operated upon by machine 102. Alternatively, or in addition, the worksite and/or machine can be identified based on manual input, as represented at block 506. For example, operator 110 can provide inputs that identify the worksite to be operated upon by machine 102.

At block 508, one or more worksite tasks are identified. For example, as represented at block 510, this can include obtaining a worksite assignment or mission plan from remote computing system 118. A worksite assignment plan can identify a predefined path to be traversed by machine 102 over the worksite, as well as the various operations to be performed by machine 102. For example, in the case of agricultural machines, a worksite assignment plan can include crop maps that identify crop rows to be harvested, yield maps, weed maps that identify weed locations to be sprayed, etc. The worksite tasks can be identified automatically, as represented at block 512. This can include receiving the worksite tasks from remote computing system 118, as represented at block 514. Also, the worksite tasks can be identified based on manual input, such as by operator 110, which is represented at block 516.

At block 518, worksite conditions can be identified. This can include weather conditions (block 520) and terrain conditions (block 522). Examples of terrain conditions include topology (block 524) and/or terrain roughness (block 526). Other terrain conditions (block 527) can be identified as well. Of course, other worksite conditions can be identified, as represented at block 528.

At block 530, operator presence is detected by operator presence detection component 408. As noted above, operator presence can be automatically detected, as represented at block 532. For example, an operator compartment of machine 102 can include a seat switch that is depressed due to weight of the operator, which indicates whether the operator is sitting in the operator compartment seat. Also, imaging sensors, or other sensors, can be placed in the operator compartment to provide an indication as to whether the operator is present. Also, operator presence can be inferred based on receipt of input through the operator interface controls. Detection of operator presence based on manual input, is represented at block 534.

Figure 7:
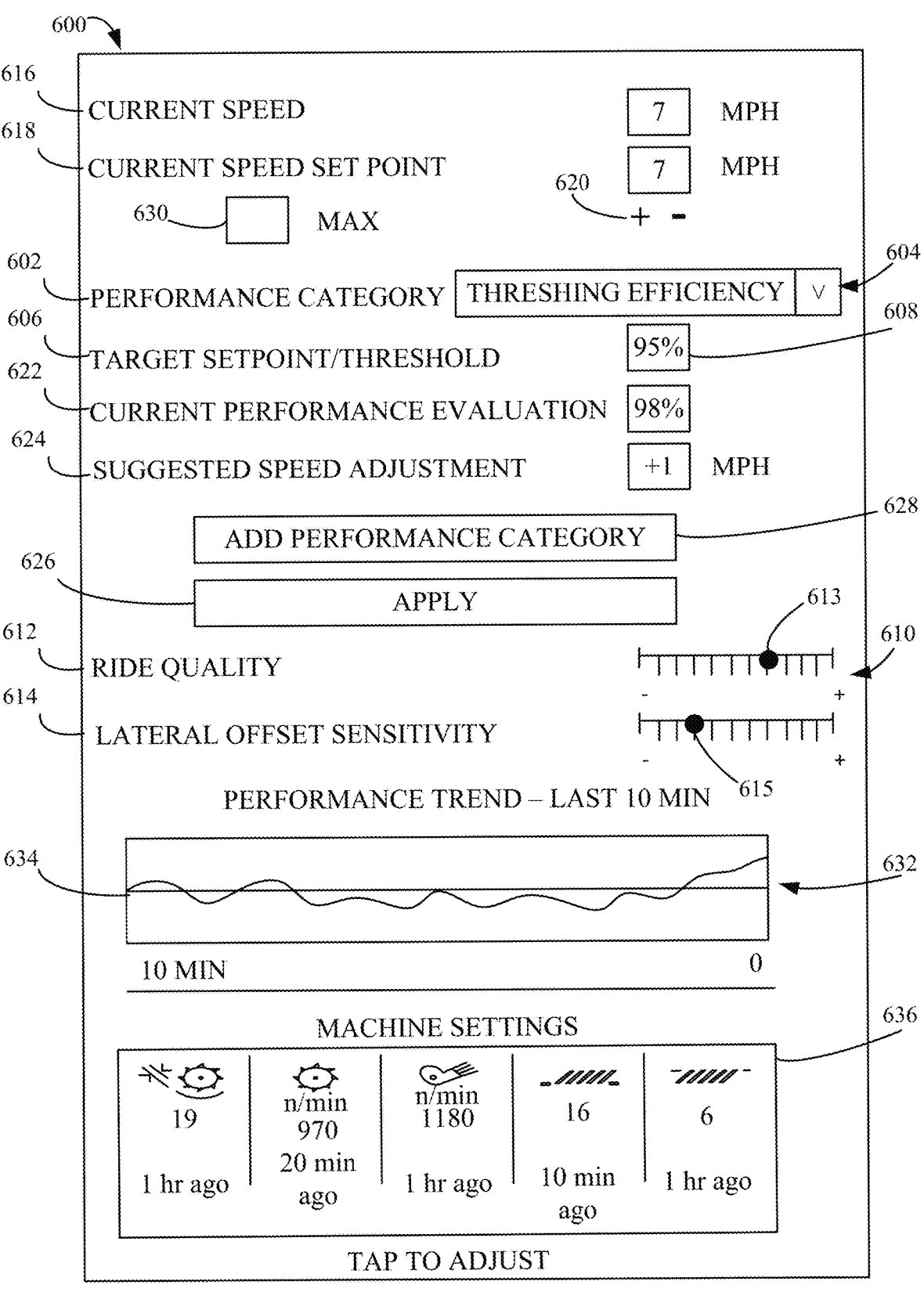
FIG. 7 shows one example of a user interface display.

At block 536, one or more performance categories, or work quality metrics of interest, are selected. In one example, operator 110 selects a work quality metric of interest through operator interface mechanisms 112. FIG. 7 illustrates one example of a user interface display 600 that can be displayed by operator interface mechanisms 112 and interacted with by operator 110. Alternatively, or in addition, display 600 can be displayed to another user, such as remote user 123.

As shown in FIG. 7, user interface display 600 includes a performance category selection user input mechanism 602 that facilitates selection of a work quality metric (at block 536 in FIG. 6) by operator 110. In the example illustrated in FIG. 7, input mechanism 602 includes a drop down box 604 that, which actuated, displays a list of possible performance categories from which the user can select the work quality metric of interest. In FIG. 7, threshing efficiency for harvesting machine is selected and displayed in mechanism 602.

Of course, the performance categories can depend on the type of machine being utilized. For example, in the case of an agricultural tilling machine, a performance category can include a measure of residue build-up on the ground-engaging tilling implements. In the case of an agricultural planting machine, a performance category can include seed singulation, that being an indication of the percentage of seeds that are placed with a desired seed spacing. In the case of an agricultural spraying machine, a performance category can include spraying accuracy, indicating the percent of target plants that are sprayed by spray nozzles of the machine. These target performance parameters can be defined in the worksite assignment plan obtained at block 510, or can be obtained in other ways as well.

Referring again to FIG. 6, at block 538 a machine learning model is obtained that corresponds to the selected performance category, selected at block 536. Multiple different machine learning models can be obtained if multiple performance categories are selected at block 536. As noted above, the machine learning model can be trained by training component 432 using training data as represented at block 540. The machine learning model can include a neural network (block 542), a deep machine learning system (block 544), a clustering algorithm (block 546), a Bayesian system (block 458), or the model can include other machine learning models (block 550).

At block 552, a target metric value is selected or otherwise defined for the quality metric(s), selected at block 536. The target metric value can be selected in any of a number of ways. The target metric value can be automatically selected at block 554. For example, the target metric value can be selected based on input from remote computing system 118, as indicated at block 556. At block 558, the target metric value can be selected based on manual input. For example, referring again to FIG. 7, user interface display 600 includes a target metric value selection user input mechanism 606, that allows operator 110 (or other user) to set a target metric value for the selected performance categor(ies) (i.e., threshing efficiency in the example of FIG. 7). User input mechanism 606 can include any of a number of different types of user input mechanisms. For example, user input mechanism 606 can include a text box, a drop down box, a slider, or any other type of user input mechanism that allows the user to set the target or threshold metric value for the given performance category. In the example of FIG. 7, the operator has set a target threshing efficiency of ninety-five percent using text box 608.

Referring again to FIG. 6, the target metric value can be selected in other ways as well, as represented at block 560. At block 562, one or more performance metric weighting parameters are identified. As noted above, this can include weighting parameters based on lateral offset of machine 102 relative to the desired or target machine path, as represented at block 564. Also, the performance metric weighting parameters can include ride quality, as represented at block 566, and can include other weighting parameters as represented at block 568. The performance metric weighting parameters can be identified in any of a number of ways. In one example, the weighting parameters are input by the operator through operator interface mechanisms 112.

With reference again to FIG. 7, user interface display 600 includes user input mechanisms 610 that allow operator 110 to set the weighting parameters. In the example of FIG. 7, a ride quality user input mechanism 612 allows the user to set a desired ride quality and a lateral offset user input mechanism 614 allows the operator to set a lateral offset sensitivity. The user input mechanisms can include any of a variety of different types of user input mechanisms. In the example of FIG. 7, the user input mechanisms include slider mechanisms 613 and 615, respectively, that each have a plurality of discrete slider positions that allow the operator to set the ride quality and lateral offset sensitivity between minimum and maximum settings.

Application of the performance metric weighting parameters in determining a target machine speed are discussed in further detail below. Briefly, however, the ride quality weighting parameter defines an extent to which ride quality of the operator is considered in determining how much to adjust machine speed, given the difference between the current performance parameters and the target performance parameters. For example, for a given difference between the current and target performance metrics, an increase of three miles per hour (MPH) is selected for a minimum ride quality setting (i.e., ride quality has a low weighting effect on the machine speed selection) and whereas an increase of one MPH is selected for a maximum ride quality setting (i.e., ride quality has a high weighting effect on the machine speed selection). Similarly, the lateral offset sensitivity can indicate a degree to which lateral offset is acceptable. During operation, higher machine speeds can increase the likelihood that the machine deviates from the machine path, resulting in lateral offset between the current machine location and the desired machine path.

Referring again to FIG. 6, at block 570 in situ data is received that indicates operating parameters of machine 102. For example, the data can be received from on-board sensors, represented at block 571. Alternatively, or in addition, as represented at block 572 in situ data can be remotely sensed, such as by another machine on or proximate to the worksite. For instance, a UAV flying above the worksite can provide imaging data that indicates how machine 102 is performing to meet the work assignment or plan.

As discussed below, an indication of work quality can be based on machine data acquired by machine sensors, as represented at block 573. For instance, in the example of combine 200, machine data is received at block 573 based on input from the sensors discussed above with respect to FIG. 2.

Alternatively, or in addition, work quality can be based on image data obtained from imaging sensors, as represented at block 574. For instance, in an example agricultural harvester, a camera can acquire images that provide information on residue percentage. In another example of an agricultural tilling machine, a camera can acquire images that provide information on ground engagement of tilling tools. In another example of an agricultural spraying machine, a camera can acquire images that provide information on work coverage area.

Of course, in situ data can be received in other ways as well, as represented at block 576.

At block 578, a current metric value is obtained for the quality metric of interest. In the illustrated example, the current metric value is obtained by applying the relevant performance metric generator(s), as represented at block 580. In the example of FIG. 7, if threshold efficiency is selected, performance metric generator component 148 utilizes material loss/savings metric generator component 302 to generate an indication of the amount of grain loss from the harvesting machine.

The current metric value can be generated based on prior data, such as data obtained from prior data collection systems 120 (block 581) and/or in situ data (block 582) such as data obtained from sensors 124. Of course, the current metric value can be obtained or generated in other ways as well, as represented at block 583.

The current metric value can represent past or current performance of machine 102, as well as predicted performance of machine 102 as it continues to travel the worksite. For example, in the case of combine 200 shown in FIG. 2, the current metric value can indicate threshing efficiency over the last one hundred feet traveled by combine 200, and can be generated based on the various sensor signals discussed above with respect to FIG. 2. Alternatively, or in addition, metric generator component 148 can predict the threshing efficiency over the next one hundred feet to be traveled by combine 200. For instance, component 148 can use yield maps and/or other data to predict how much grain will be lost at the current machine speed. This, of course, is by way of example only.

At block 584, a target or suggested machine speed is determined based on the current metric value (obtained at block 578) relative to the target metric value (obtained at block 552). In one example, the target machine speed is determined based on setting change selection component 416 applying machine learning component 530 to determine a maximum increase in machine speed that will obtain a work quality metric that meets or exceeds the target metric value. This is represented at block 585. For sake of illustration, but not by limitation, in the example shown in FIG. 7, a current threshing efficiency of ninety-eight percent is obtained at block 578 and, at block 584, the machine learning model determines that a one mile per hour increase in machine speed will maintain the threshold efficiency at or above the target of ninety-five percent. This, of course, is for sake of example only.

Setting change selection component 416 can also select the target speed based on input from curvature lookahead component 428. For example, if component 428 indicates that a sharp turn will be encountered by machine 102 in one hundred feet, and that the sharp turn will decrease the performance of machine 102, component 428 can lower the selected target speed to minimum or mitigate the effect of the path curvature.

At block 586, any weighting parameters, discussed above with respect to block 562, are applied in determining the target machine speed. For instance, a lateral offset parameter, indicating a desired lateral offset sensitivity (an allowable amount of lateral offset), is used to weight the machine speed selection. For sake of example, if a relatively small amount of lateral offset (e.g., two feet) is allowable, then the lateral offset is weighted more heavily to reduce the suggested machine speed. Conversely, if a relatively large amount of lateral offset (e.g., ten feet) is allowable, then the lateral offset is weighted less heavily to increase the suggested machine speed.

In another example, if operator presence is detected based on input from component 408, then setting change selection component 416 can weight ride quality based on indications of terrain roughness from terrain roughness detector component 412. As noted above, component 412 can determine terrain roughness based on sensor signals from sensor(s) 124 (e.g., accelerometers, gyroscopes, imaging sensors, etc.). Alternatively, or in addition, component 412 can determine terrain roughness based on terrain maps. In any case, ride quality can be weighted to increase or decrease the target machine speed, depending on the desired smoothness of the ride experience by the operator. For example, based on the ride quality weighting parameter, a threshold (e.g., maximum) attitude and/or acceleration of machine 102 can be determined. Taking into account the indications of terrain roughness, machine learning model 430 can determine a maximum machine speed that maintains the machine attitude and/or acceleration below the threshold.

The machine speed can be determined in other ways as well, as represented at block 587. At block 588, control instructions are generated to control the machine based on the target machine speed. This can include controlling operator interface mechanisms 112 to generate a display (e.g., user interface display 600), as represented at block 589. Alternatively, or in addition, control system 106 can send an indication of the target machine speed to another machine, system, or device, as represented at block 590. In another example, controllable subsystems 188 can be automatically controlled to obtain the target machine speed. For example, as illustrated at block 591, propulsion subsystem 156 can be automatically controlled based on the target machine speed. Of course, machine 102 can be controlled in other ways as well, as represented at block 592.

Referring again to FIG. 7, user interface display 600 includes a display element 616 that indicates the current speed of machine 102 and a current speed set point display element 618 that indicates the current speed set point. For instance, display element 618 indicates the speed at which control system 106 is commanding propulsion subsystem 156 to propel machine 102 over the worksite.

User interface display 600 can include speed control user input mechanisms 620 that are actuatable to increase or decrease the speed set point. For instance, user input mechanism 620 can be actuated to increase or decrease the speed set point in one MPH increments. Display 600 also includes a current performance metric display element 622 that indicates the current metric value. In the example of FIG. 7, display element 622 indicates that machine 102 has a current threshing efficiency of ninety-eight percent.

Display 600 also includes a suggested speed adjustment display element 624 that indicates a suggested speed adjustment based on the target metric value indicated by display element 606 and the current metric value indicated by display element 622. In the example of FIG. 7, a one MPH increase in speed is suggested given the current threshing efficiency of ninety-eight percent and the target threshing efficiency of ninety-five percent. In other words, speed setting change selection component 416 has determined that a one MPH speed increase will maintain the threshing efficiency at or above the ninety-five percent target.

User interface display 600 includes a suggested speed selection user input mechanism 626 that is actuatable to apply the selected speed adjustment, represented by display element 624. That is, actuation of element 626 will cause control system 106 to increase the speed of machine 102 by one MPH.

Display 600 can also include a performance category add user input mechanism 628 that is actuatable to add an additional performance category, if desired. For example, if operator 110 desires that a target threshing efficiency and a target material productivity metric are to be used in providing speed adjustments, operator 110 can actuate user input mechanism 628 to add additional performance category selection and target set point display elements, for the additional performance category.

In one example, display 600 includes a maximum speed selection user input mechanism 630 that is actuatable by operator 110 to automatically apply selected speed adjustments. In the example of FIG. 7, input mechanism 630 includes a check box that the user can toggle between automatic and manual speed adjustments. When automatic speed adjustments are selected, control system 150 is configured to automatically apply the suggested speed adjustments so that machine 102 traverses at the maximum speed that maintains the target metric values.

Also, as shown in FIG. 7, display 600 can include a display element 632 that shows the performance metric over a given time window (ten minutes in the example of FIG. 7) relative to the target set point represented by display line 634. Also, display 600 can include a machine settings display element 636 that shows various other machine settings that can be interacted with to adjust those machine settings.

It can thus be seen that the present features provide a control system that provides machine speed control based on work quality metrics. The control system can operate the machine based on internal or external parameters, to provide improved performance and productivity, and can be utilized with autonomous, semi-autonomous, and/or operator-controlled machine operation.

The present discussion has mentioned processors and servers. In one example, the processors and servers include computer processors with associated memory and timing circuitry, not separately shown. The processors and servers are functional parts of the systems or devices to which the processors and servers belong and are activated by, and facilitate the functionality of the other components or items in those systems.

Also, a number of user interface displays have been discussed. The user interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The user actuatable input mechanisms can be actuated in a wide variety of different ways. For instance, user actuatable input mechanisms can be actuated using a point and click device (such as a track ball or mouse). The user actuatable input mechanisms can be actuated using hardware buttons, switches, a joystick or keyboard, thumb switches or thumb pads, etc. The user actuatable input mechanisms can also be actuated using a virtual keyboard or other virtual actuators. In addition, where the screen on which the user actuatable input mechanisms are displayed is a touch sensitive screen, the user actuatable input mechanisms can be actuated using touch gestures. Also, where the device that displays them has speech recognition components, the user actuatable input mechanisms can be actuated using speech commands.

A number of data stores have also been discussed. It will be noted the data stores can each be broken into multiple data stores. All of the data stores can be local to the systems accessing the data stores, all of the data stores can be remote, or some data stores can be local while others can be remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, logic, and interactions. It will be appreciated that any or all of such systems, components, logic and interactions may be implemented by hardware items, such as processors, memory, or other processing components, including but not limited to artificial intelligence components, such as neural networks, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 8:
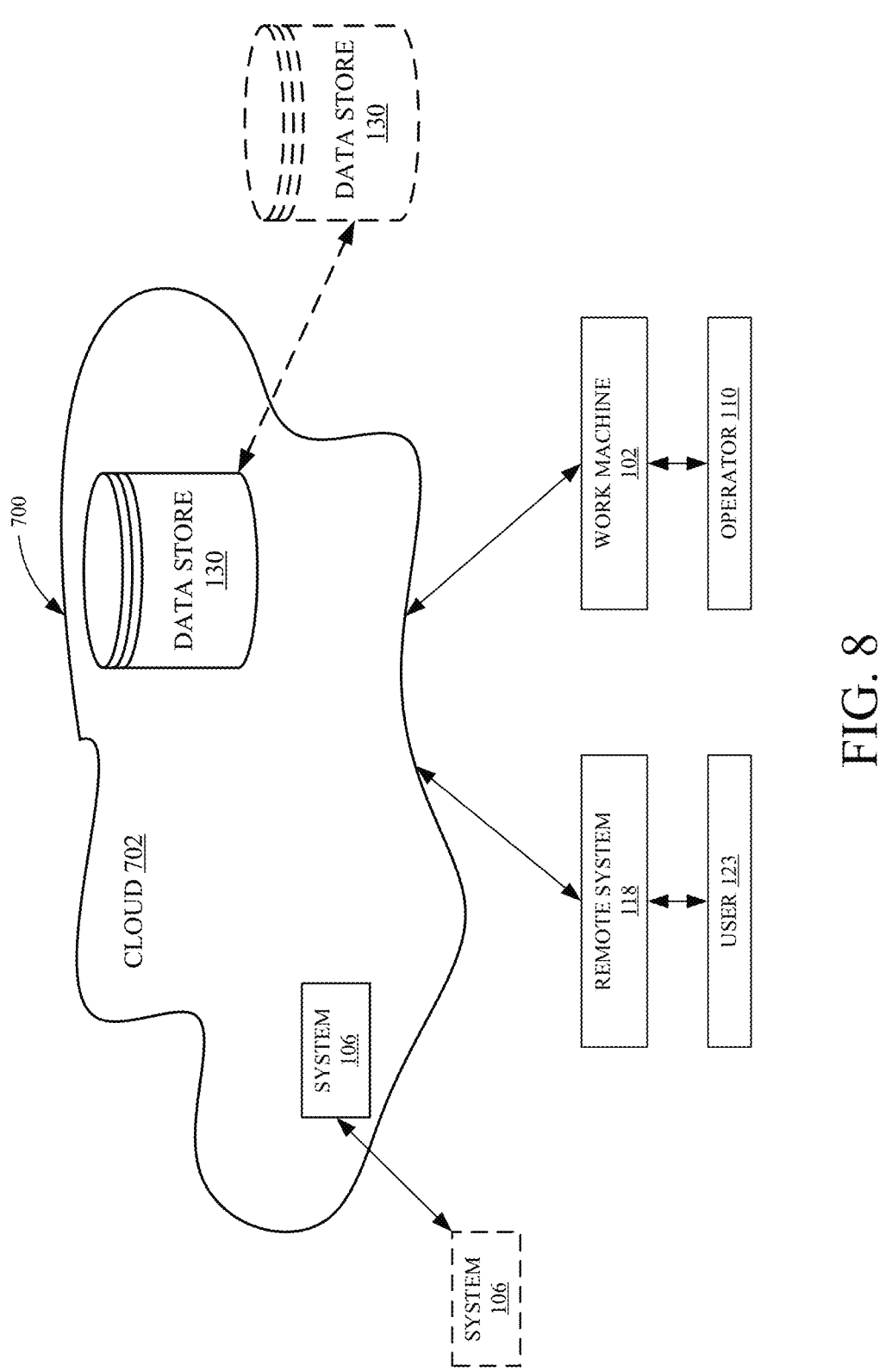
FIG. 8 is a block diagram showing one example of the architecture illustrated in FIG. 1, deployed in a remote server architecture.

FIG. 8 is a block diagram of one example of work machine architecture 100, shown in FIG. 1, where machine 102 communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and the remote servers can be accessed through a web browser or any other computing component. Software or components shown in previous FIGS. as well as the corresponding data, can be stored on servers at a remote location. The computing resources in a remote server environment can be consolidated at a remote data center location or the computing resources can be dispersed. Remote server infrastructures can deliver services through shared data centers, even though the services appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 8, some items are similar to those shown in previous figures and the items are similarly numbered. FIG. 8 specifically shows system 106 from previous FIGS. can be located at a remote server location 702. Therefore, machine 102, machine 104, machine 116, and/or system 118 can access those systems through remote server location 702.

FIG. 8 also depicts another example of a remote server architecture. FIG. 8 shows that it is also contemplated that some elements of previous FIGS. are disposed at remote server location 702 while others are not. By way of example, one or more of data store 130 and system 106 can be disposed at a location separate from location 702, and accessed through the remote server at location 702. Regardless of where the systems and data stores are located, the systems and data stores can be accessed directly by machines 102, 104, and/or 116 through a network (either a wide area network or a local area network), the systems and data stores can be hosted at a remote site by a service, or the systems and data stores can be provided as a service, or accessed by a connection service that resides in a remote location. All of these architectures are contemplated herein.

It will also be noted that the elements of the FIG., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
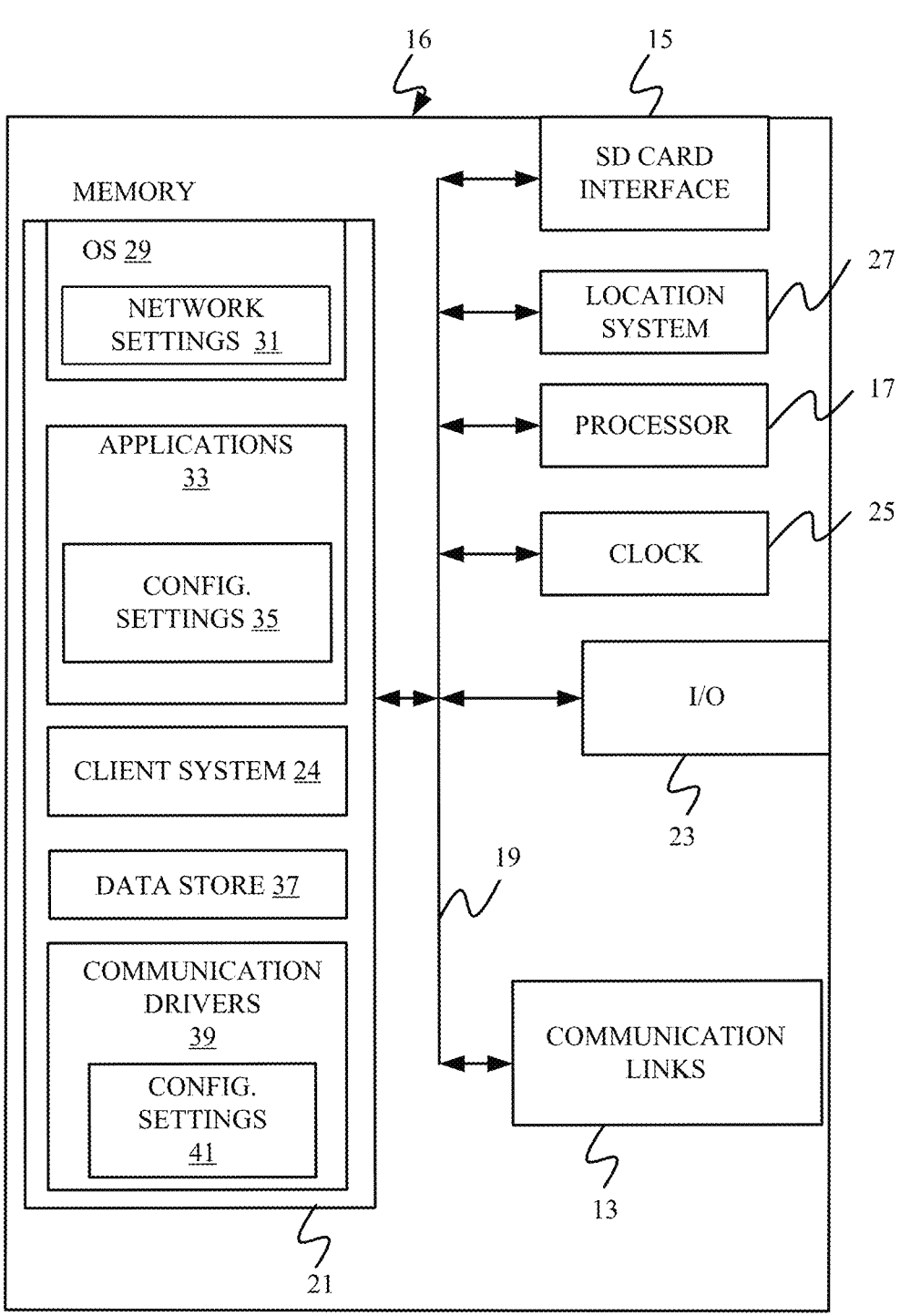
FIGS. 9-11 show examples of mobile devices that can be used in the architectures shown in the previous figures.
Figure 10:
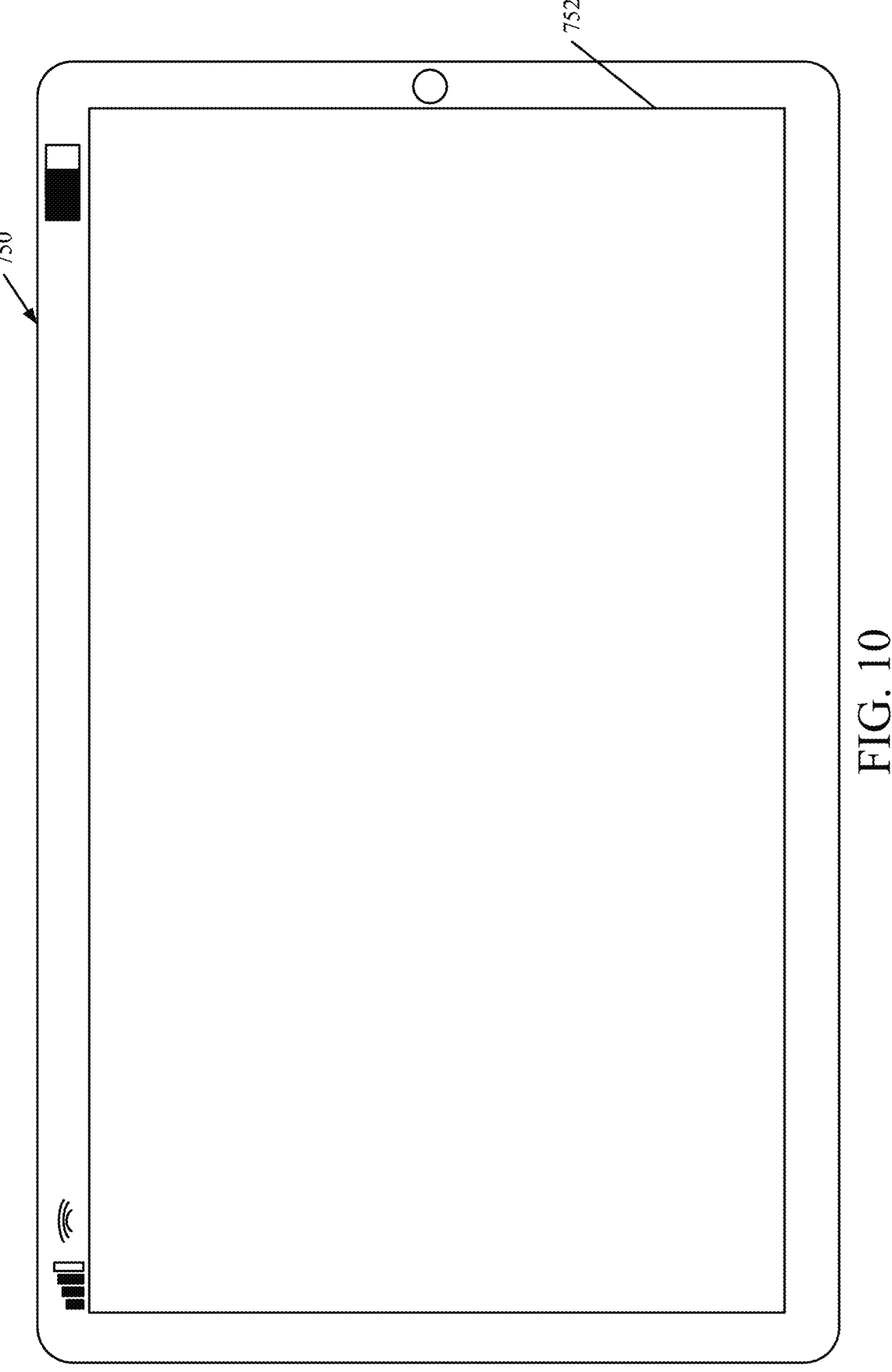
Figure 11:
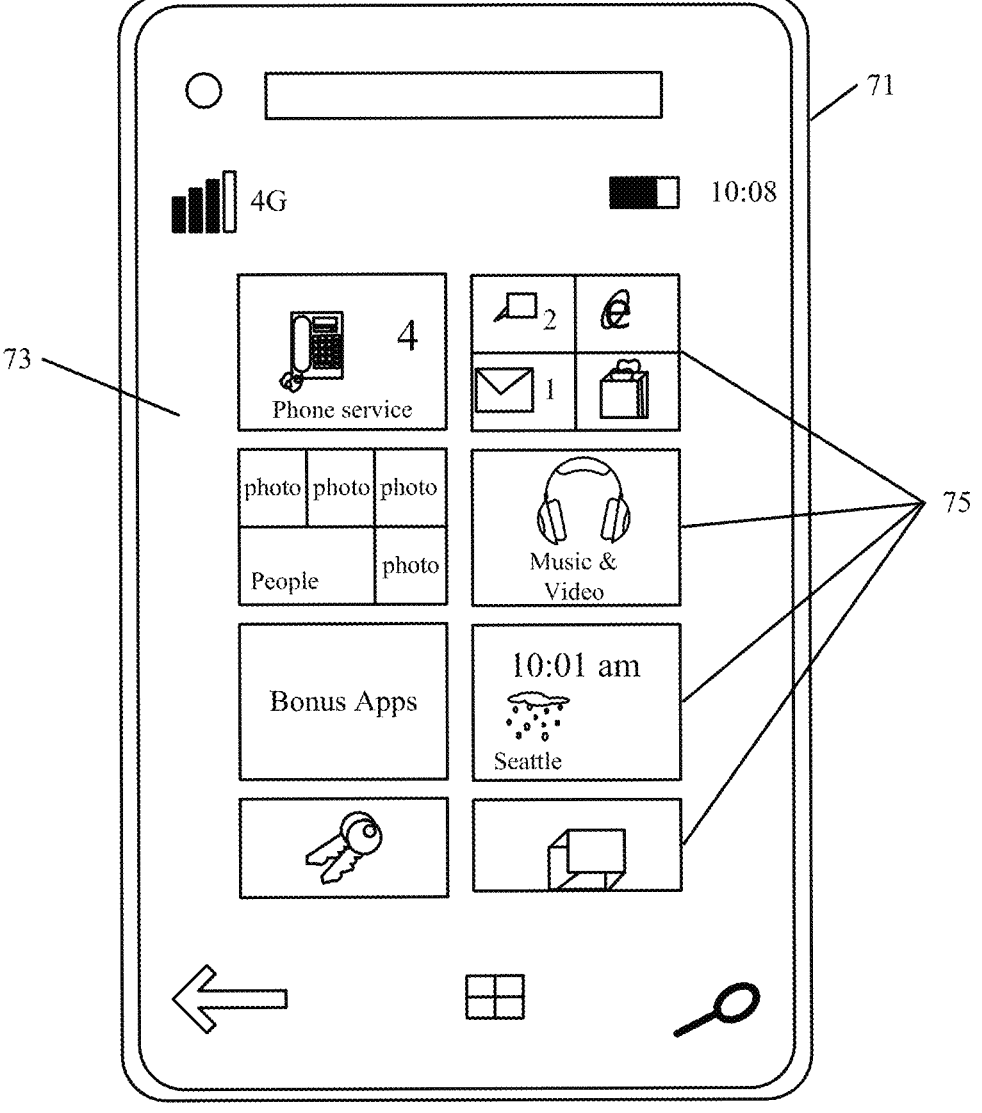

FIG. 9 is a simplified block diagram of one illustrative example of a handheld or mobile computing device that can be used as a user's or client's handheld device 16, in which the present system (or parts of the present system) can be deployed. For instance, a mobile device can be deployed in the operator compartment of machine 102 and/or 104 for use in generating, processing, or displaying machine speed and performance metric data. FIGS. 10-11 are examples of handheld or mobile devices.

FIG. 9 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively includes a real time clock component that outputs a time and date. Clock 25 can also, illustratively, provide timing functions for processor 17.

Location system 27 illustratively includes a component that outputs a current geographic location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 750. In FIG. 10, computer 750 is shown with user interface display screen 752. Screen 752 can be a touch screen or a pen-enabled interface that receives inputs from a pen or stylus. Screen 752 can also use an on-screen virtual keyboard. Of course, screen 752 might also be attached to a keyboard or other user input device through a suitable attachment mechanism, such as a wireless link or USB port, for instance. Computer 750 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
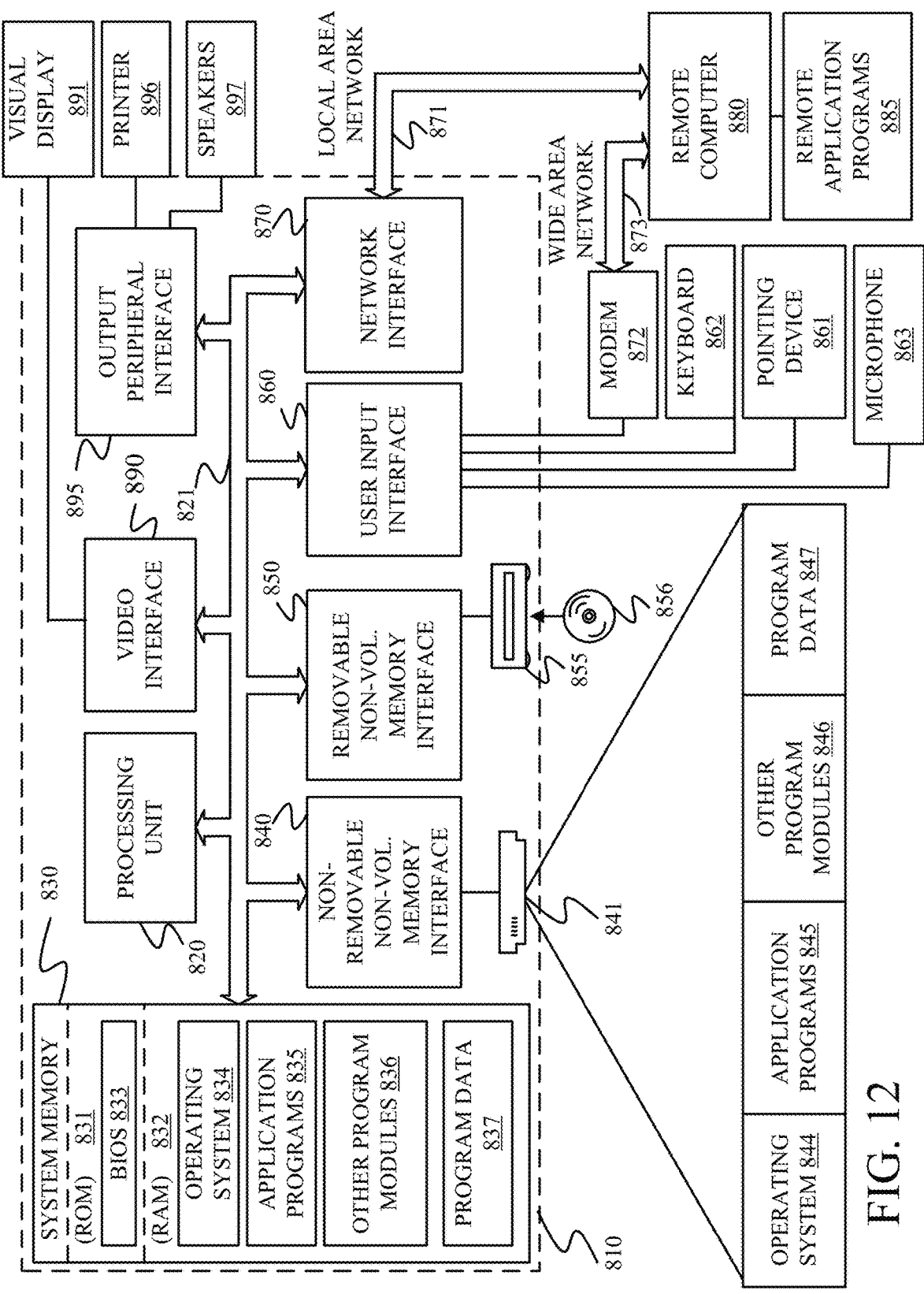
FIG. 12 is a block diagram showing one example of a computing environment that can be used in the architectures shown in the previous figures.

FIG. 12 is one example of a computing environment in which elements of previous FIG., or parts of them, (for example) can be deployed. With reference to FIG. 12, an example system for implementing some embodiments includes a general-purpose computing device in the form of a computer 810 programmed to operate as discussed above. Components of computer 810 may include, but are not limited to, a processing unit 820 (which can include processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may include computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware components. For example, and without limitation, illustrative types of hardware components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile agricultural machine comprising:
a set of ground engaging elements;
a controllable subsystem configured to perform a work operation on a field; and
a control system configured to:
identify a work performance metric representing a performance characteristic of the work operation having an inverse relationship to traversal speed of the mobile agricultural machine over the field;
receive an indication of operator presence relative to the mobile agricultural machine;
generate a weighting parameter that weights the work performance metric relative to a ride quality metric based on the indication of operator presence;
determine a target machine speed based on the weighting parameter; and
output a control instruction based on the target machine speed.

2. The mobile agricultural machine of claim 1, wherein the set of ground engaging elements comprise a set of ground engaging traction elements, and further comprising:
a propulsion subsystem configured to drive one or more ground engaging traction elements of the set of ground engaging traction elements, and
wherein the control system is configured to:
control the propulsion subsystem based on the target machine speed.

3. The mobile agricultural machine of claim 1, wherein the indication of operator presence indicates presence of an operator in an operator compartment of the mobile agricultural machine during the work operation of the mobile agricultural machine on the field.

4. The mobile agricultural machine of claim 1, wherein the control system is configured to:
determine a target metric value for the work performance metric based on the weighting parameter;
receive machine data indicative of operation of the mobile agricultural machine;
generate a current metric value for the work performance metric based on the machine data; and
determine the target machine speed based on the current metric value relative to the target metric value.

5. The mobile agricultural machine of claim 4, wherein the current metric value represents predicted performance of the work operation.

6. The mobile agricultural machine of claim 1, wherein the ride quality metric is based on an indication of roughness of the field.

7. The mobile agricultural machine of claim 1, wherein the weighting parameter is based on a ride smoothness setting, and wherein the control system is configured to:
select a first target machine speed for a first ride smoothness setting; and
select a second target machine speed for a second ride smoothness setting.

8. The mobile agricultural machine of claim 3, wherein the indication of operator presence is received from an operator presence detector comprising at least one of:

a camera configured to capture a view of at least a portion of the operator compartment,
an operator seat depression switch, or
an operator input mechanism configured to detect whether the operator is engaging one or more controls within the operator compartment during the work operation of the mobile agricultural machine.

9. The mobile agricultural machine of claim 1, wherein the work performance metric represents one or more of:
fuel consumption, productivity, power utilization, agricultural material loss, or agricultural material quality.

10. The mobile agricultural machine of claim 1, wherein the control system is configured to:
receive an indication of a lateral offset parameter representing a difference between a position of the mobile agricultural machine and a predefined path; and
determine the target machine speed based on the lateral offset parameter.

11. The mobile agricultural machine of claim 1, wherein the control system is configured to:
receive an indication of machine path curvature in a path of the mobile agricultural machine; and
determine the target machine speed based on the machine path curvature.

12. A method of controlling a mobile agricultural machine, the method comprising:
identifying a work performance metric representing a performance characteristic of a work operation having an inverse relationship to traversal speed of the mobile agricultural machine over a field;
receiving an indication of operator presence with respect to the mobile agricultural machine;
generating a weighting parameter that weights the work performance metric relative to a ride quality metric based on the indication of operator presence;
determining a target machine speed based on the weighting parameter; and
outputting a control instruction based on the target machine speed.

13. The method of claim 12, and further comprising:
determining a target metric value for the work performance metric based on the weighting parameter;
receiving machine data indicative of operation of the mobile agricultural machine;
generating a current metric value for the work performance metric based on the machine data; and
determining the target machine speed based on the current metric value relative to the target metric value.

14. The method of claim 12, wherein the ride quality metric is based on an indication of roughness of the field.

15. The method of claim 12, wherein the weighting parameter is based on a ride smoothness setting.

16. The method of claim 12, wherein the work performance metric represents one or more of:
fuel consumption, productivity, power utilization, agricultural material loss, or agricultural material quality.

17. An agricultural machine control system comprising:
at least one processor; and
memory storing instructions executable by the at least one processor, wherein the instructions, when executed, cause the agricultural machine control system to:
identify a work performance metric representing a performance characteristic of a work operation having an inverse relationship to traversal speed of a mobile agricultural machine over a field;
receive an indication of operator presence with respect to the mobile agricultural machine;

generate a weighting parameter that weights the work performance metric relative to a ride quality metric based on the indication of operator presence;

determine a target machine speed based on the weighting parameter; and output a control instruction based on the target machine speed.

18. The agricultural machine control system of claim 17, wherein the instructions, when executed, cause the agricultural machine control system to:

determine a target metric value for the work performance metric based on the weighting parameter;

receive machine data indicative of operation of the mobile agricultural machine;

generate a current metric value for the work performance metric based on the machine data; and determine the target machine speed based on the current metric value relative to the target metric value.

19. The agricultural machine control system of claim 17, wherein the ride quality metric is based on an indication of roughness of the field.

20. The agricultural machine control system of claim 17, wherein the weighting parameter is based on a ride smoothness setting.

* * * * *